Patented Sept. 26, 1950

2,523,446

UNITED STATES PATENT OFFICE 2,523,446

METHOD OF PREPARING SOLUTIONS OF SOLID VULCANIZED OILS

Karl Werner Posnansky, Stamford, Conn.

No Drawing. Application January 6, 1947,
Serial No. 720,475

8 Claims. (Cl. 106—220)

This invention relates to vulcanized fatty oils, and more particularly to a method of treating such oils in order to render them capable of wider industrial application.

The solid elastic products obtained by the vulcanization of fatty oils and generally known as rubber substitutes are widely used a compounding ingredients in the manufacture of natural and synthetic rubber goods.

They are incorporated into the solid rubber, according to present practice, by mixing on roller mills, or kneading in dough mixers or similar devices.

The object of the present invention is to bring solid vulcanized oils or rubber substitutes into solutions in organic solvents, which may be utilized as solutions, or from which the solid rubber substitutes can be recovered by evaporation or other removal of the solvent.

Such solutions open a wide new field for the use of rubber substitutes, either by themselves or blended with various resins, plastics and the like. Specially, solid rubber substitute in form of a solution in organic solvents can be used in a simple and efficient way as a compounding ingredient in rubber or synthetic rubber solutions, plastic and varnish solutions, and other materials which are either processed or applied in a dissolved state, using organic solvents.

The products which may be brought into solution in organic solvents according to the method later described, are solid hot-vulcanized oil or rubber substitutes. They are commercially produced, at the present, mainly from fatty (unsaturated) oils of vegetable and, to a smaller extent, animal origin.

The term "solid" in the description of the vulcanized products refers to the degree of vulcanization. It means that vulcanization is carried to the stage in which the reaction product is a solid elastic material, as distinguished from the more or less liquid viscous or barely gelled products obtained by partial or incomplete vulcanization.

The term "hot-vulcanized" comprises all the methods used in manufacturing rubber substitutes from such fatty oils which employ one or more vulcanizing agents together with the action of heat at a temperature of from 120° C. to 200° C. to bring about vulcanization of the oil and solidification of the reaction product. The most commonly used of these vulcanization agents is sulfur, either used alone or together with other compounds, activators, accelerators, modifiers and the like.

Another well known method of producing rubber substitutes from oils is by means of so-called "cold-vulcanizing." In this method, vulcanization is effected by mixing sulfur chloride with the oil. It is found that the present invention is not applicable to such cold-vulcanized products, probably because the chlorine present interferes with the reaction.

The term "organic solvent" in connection with this invention, is intended to denote liquids of organic chemical composition, whether they are derived from natural sources or are produced by synthetic processes. While the most commonly used of these liquids are the petroleum and coal tar solvents, turpentine and the like, solvents of many different types may be found suitable for the purpose of the invention.

When a solid hot vulcanized oil (rubber substitute) in ground, shredded, pulverized or otherwise comminuted form is mixed with an organic solvent, no effect other than a more or less moderate swelling of the rubber substitute particles can be observed.

I have now discovered that if a small percentage of a basic, nitrogenous substance is added to the mixture of rubber substitute and organic solvent, a rapid and vigorous swelling of the substitute particles takes place, and, if the proper proportions are employed, the whole mixture is converted to a uniform gel, which in turn, after a short space of time, liquefies to a clear solution, containing the whole rubber substitute in dissolved form.

Moreover, on exaporating the solvent from this solution, a clear uniform, coherent and solid film, resembling a lacquer or varnish film, and consisting of practically unchanged rubber substitute is obtained.

In carrying out the invention, I preferably proceed as follows:

I first mix the solvent and the rubber substitute in the desired and suitable proportion, for instance 9 parts of solvent and 1 part of ground rubber substitute to make a solution of 10% solids, by either adding the substitute to the solvent or pouring the solvent over the substitute. The mixture is stirred shortly to assure an even distribution and wetting of the substitute.

To this mixture I add a small portion of a nitrogenous basic substance. The amount of the basic substance required to bring about solution will vary with the type of rubber substitute and the type and proportion of solvent used, and will also depend to a large extent on the specific and molecular weight, basicity and chemical composition of the nitrogenous substance used. In numerous cases, I find that a fraction of one percent of the total mix is amply sufficient to bring about the desired effect. The necessary amount can be easily established by preliminary tests.

While or after the basic substance is added, distribution thereof throughout the mix is brought about by shaking, stirring or similar means. Then the mixture can be left to itself. After a short time it will have converted to a clear uniform liquid, from which the rubber substitute can be recovered in a solid coherent form by evaporation of the solvent.

Any basic, nitrogenous substance may be used for carrying out the invention, provided such substance (a) Has a sufficiently definite and strong basic reaction; and (b) Is completely or partially soluble in the solvent employed.

As regards basicity, the test is the property of turning the color of pH sensitive dyes, such as contained in litmus paper, or of giving a marked alkaline value with an electric pH meter, that is to say, a meter reading substantially in excess of 8.

The more strongly alkaline or basic the substance, the more efficiently it works, other things being equal. For example, the primary aliphatic amines work efficiently and rapidly. The secondary amines work well, but not so fast. The tertiary amines will work, but act very slowly. This corresponds with the decline in basicity. With the particular compounds tested in this connection, the meter reading of a concentrated or saturated solution in water was 12.2 for the primary, 11.1 for the secondary, and 9.5 for the tertiary amine.

Among the basic nitrogenous compounds suitable for use for the purposes of the invention are ammonia, aliphatic primary, secondary and tertiary amines, both in normal and iso-configurations, aliphatic diamines, such as ethylene and propylene diamines, aliphatic poly amines, primary and secondary aromatic amines, such as aniline and dicyclohexyl amine, primary, secondary and tertiary amino alcohols, such as mono-, di- and tri-ethanolamine, amino-butanol, and heterocyclic compounds such as piperidine and piperazine, or any other organic nitro-compound which has a sufficiently basic reaction and is—or can be made—somewhat soluble in the solvent used.

I find that primary and secondary compounds are the more efficient. In practising my invention I prefer to use the primary and secondary aliphatic amines, since practically all members of this group meet the requirements with respect to basicity and miscibility with most solvents perfectly, are easy to handle, and with various lengths of aliphatic chain, can be obtained with any desired boiling point and rate of evaporation.

In the aromatic series, even the primary amines are not very strongly basic, since the phenyl group has an "electronegative" or acidic nature, thereby detracting from the basicity of the compound. Consequently even simple primary and secondary aromatic amines are practically borderline substances, working only fairly well with the more easily soluble types of rubber substitutes (such as vulcanized soya bean oil) and poorly with harder types (such as vulcanized rapeseed oil). Substituted aromatic amines are mostly too weakly basic to react at all.

Among the heterocyclic compounds, both piperidine and piperazine, corresponding to secondary bases, and showing fairly strong basic behavior, work satisfactorily, while pyridine, being an extremely weak tertiary type base, is inefficient.

A similar condition exists with regard to the amino alcohols. Primary, secondary and tertiary amino alcohols (such, for example as mono-, di-, and tri-ethanolamine) work with an efficiency diminishing from the primary towards the tertiary compound. The secondary and tertiary represent borderline substances by reason of their poor solubility in the solvents used.

In case the nitrogenous substance to be used is gaseous at normal temperature, as in the case of ammonia gas or low boiling amines (e. g. methyl amine) the addition thereof to the solvent mix can be effected by bubbling the gaseous substance through the rubber substitute-solvent mixture until a sufficient amount is absorbed by the mix. After liquefaction, any undesirable surplus of such gaseous substance can be removed by blowing with air, moderate heating or similar procedure.

Some of the fatty oils most commonly used for the making of rubber substitutes, and to which the present invention is applicable, are rapeseed, soya bean, corn, peanut, sunflower, sesame, cotton seed, linseed and castor oils. Many of these oils are made up largely of glycerides of more or less unsaturated fatty acids containing only a carboxyl group, but some of them, such as castor oil, comprise glycerides of acids containing also a hydroxyl group.

These two types of oils require distinct types of organic solvents.

For oils of the first type, aromatic hydrocarbons such as toluol and xylol are effective solvents, as are also a number of commercial solvents such as "Solvesso," Shell solvent, "Amsco-Solv. A," Union Oil solvent, etc., these commercial organic solvents being of the petroleum type, with varying content of aromatic hydrocarbons. Turpentine can also be successfully used in many cases.

For oils of the second type, such as castor oil, having large proportions of compounds containing hydroxyl groups, such solvents are not effective. In this case, ketones such as ethyl-methyl ketone, methyl-isobutyl ketone, etc., can be employed. The suitability of various types of solvents for different types of vulcanized oils can easily be established by a preliminary test.

While the method described above is the most simple and generally practical way to perform the process of my invention, certain variations will be found advantageous in a number of cases.

For instance, while I generally prefer to carry out the solution process at room or even lower temperature, in view of the fact that many of the organic solvents used in the solution field are very volatile and of high inflammability (low flash point), the application of (moderate) heat can be beneficial in some cases. Where speed is essential, the time of the solvation process can be cut down considerably by heating. For example, a rubber substitute solvent mixture requiring at room temperature about three hours, after addition of the basic substance, to yield a clear solution, will convert to a clear solution in approximately one-half hour if kept at 200 degrees Fahrenheit (94° C.).

Furthermore, heating can be helpful in such cases, where the tolerance or solvency power of a specific solvent for the rubber substitute is low compared with the concentration desired. As in the case of rubber or other plastic etc. solutions, there is always for each solvent and rubber substitute combination a certain maximum concentration of solids beyond which the solution will lose its liquid character and become a gel.

At higher temperature, this maximum concentration is somewhat increased. Consequently, solutions with a higher concentration of solid substitute can be obtained and maintained in the liquid state at a somewhat elevated temperature.

It should be stressed, however, that apart from the limitation imposed upon the temperature to be applied by the boiling point and other qualities of the solvent, it should be kept definitely below the point at which decomposition of the rubber substitute would occur, in order to assure that a substantially unchanged and undecomposed rubber substitute can be recovered from the solution.

Another helpful modification in performing the process of the invention is the application of continuous and vigorous stirring or other agitation during and after the solution process. While this is, likewise, generally unnecessary, it can help in accelerating the solvation, whether at room or higher temperature especially when basic introgenous substances of low solubility are used. It also appears to prevent or retard gelling of solutions, in which the concentration of solid substitute is slightly higher than allowable for the specific type of solution. This is due to the tyxotrophic character of the gel which results from an excessive proportion of solids in the solution.

Wetting agents, soaps, etc., to promote wetting of the rubber substitute by the solvent and facilitate the mixing of the two component parts, prior to the addition of the basic substance may likewise be applied advantageously in some cases.

As indicated before, the solution of solid rubber substitutes in organic solvents obtained by the process of this invention can be used for a great variety of purposes.

The solution can be applied as such for a protective coating, insulation or impregnation by dipping, spraying or brushing processes. Articles so treated with the solution will, upon evaporation of the solvent, be coated with a solid, elastic film of rubber substitute, or in the case of porous articles, textiles and the like, be thoroughly impregnated therewith.

For applications of this kind, rubber substitutes can be used which contain, besides the vegetable oil and vulcanizing agents, additions of rosin, resins, bituminous substances, tar, asphalts, waxes and other suitable ingredients which can be added and incorporated during the manufacturing process.

Or the solution of straight fatty oil or specially compounded substitutes may be blended with solutions of such resins, etc, to obtain on drying a film, coating or impregnation of just the desired quality. Instead of blending with solutions of other substances, such substances may be added to and dissolved in the vulcanized oil solution, or they may be dissolved simultaneously with the vulcanized oil, or even be dissolved in the solvent prior to dissolving the vulcanized oil therein by the special process described above.

By suitable blends adhesive coatings of the pressure sensitive or heating sealing types can be obtained.

Specially, the rubber substitute solution in organic solvents can be used to introduce rubber substitute into solutions of natural rubber or synthetic rubbers, plastics of various kinds, varnishes, lacquers, paints and other substances processed, or applied in the form of solutions. Brittle and hard substance can so be plasticized, softened and given elastic qualities, increased or decreased tack can be obtained, aging and resistance against corrosion and moisture improved, and temperature stability promoted.

Solutions of rubber substitute can also be dispersed in water as emulsions, and be applied or further compounded in this form.

A quite different use to which solutions of rubber substitute can be put is the fractioned precipitation of substitute in various degrees of polymerization, by mixing the solution of the whole substitute in a solvent of high solvency power, with various amounts of a solvent of limited solvency power. By such a procedure, the highest polymerized proportion of substitute will be precipitated first from the solution and can be filtered out and obtained separately.

The following specific examples will illustrate various ways in which the invention can be actually carried out.

Example 1

10 parts of a finely ground solid rubber substitute, made by heat-vulcanizing rapeseed oil with sulfur according to customary procedure, are mixed with 90 parts of toluol. A slow stream of gaseous ammonia is bubbled through the mixture and distributed therein by occasional shaking and stirring. After 15 to 20 minutes the addition of ammonia is discontinued and the mix is left to itself. In the course of 2-3 hours, at room temperature, a clear solution results from which a uniform solid film of the substantially unchanged vulcanized oil may be recovered by evaporation.

Example 2

10 parts of a solid ground rubber substitute made from soya bean oil and sulfur by the heat-vulcanization method are mixed with 90 parts of xylol. ½ part of piperidine is added to the mix under stirring and the mixture left standing, at room temperature, until a clear solution is obtained. The solid vulcanized oil can be recovered from the solution by evaporation or precipitation.

Example 3

10 parts of a solid ground rubber substitute made by hot-vulcanizing castor oil with sulfur are mixed with 90 parts of methyl ethyl ketone and 1 part of isopropylamine added to the mixture. The mixture is kept at 60 degrees centigrade for 2 to 3 hours. A clear solution of the vulcanized castor oil in methyl-ethyl ketone results.

Example 4

10 parts of a soya bean oil rubber substitute made by hot-vulcanizing soya bean oil with sulfur and hydrogen sulphide, are mixed with 90 parts of turpentine and 2 parts of n-butylamine stirred into the mix. After 24 hours standing, a clear solution will result.

Example 5

100 parts of a solid ground hot vulcanized soya bean oil are mixed with 100 parts of a hard cumar resin and 500 parts of "Solvesso #1" solvent and 3 parts of 2 amino-1-butanol are stirred into the mixture. The mixture is kept stirred until the cumar resin is dissolved, in order to keep the resin particles from adhering to each other. The dissolution of the resin can be accelerated by moderate heating of the mix. A uniform clear solution containing both rubber substitute and resin will result. A film obtained by evaporating this solution represents a uniform product retaining the elastic flexible qualities of the vulcanized oil plus the increased hardness and strength of the resin.

This example can also be executed in two steps, by dissolving either first the resin alone in the solvent and then adding the vulcanized oil and amine, or vice versa.

*Example 6*

Same as Example 5 except that a soft cumar or other resin is used, yielding a film with a tacky adhesive surface.

*Example 7*

The same basic components as in Examples 5 and 6 are used, except that the resin is added to the fatty oil prior to hot-vulcanization and the resulting solid resinous vulcanized oil is brought into solution as described.

What I claim is:

1. The method of bringing solid, hot-vulcanized oils into solution which comprises mixing the vulcanized oil with an organic liquid solvent selected from the group consisting of aliphatic and aromatic hydrocarbon solvents, and turpentine, in the presence of a relatively small proportion of a basic nitrogenous substance selected from the group consisting of primary, secondary and tertiary aliphatic amines, primary and secondary aromatic amines, amino-alcohols, piperidine, piperazine and ammonia, said substance being capable of giving a pH value of at least 9.5, and soluble to at least some extent in the particular solvent employed.

2. The method of bringing solid, hot-vulcanized oils into solution which comprises mixing the solid vulcanized oil in a finely divided state, at room temperature, with an organic liquid solvent selected from the group consisting of aliphatic and aromatic hydrocarbon solvents, and turpentine, in the presence of a relatively small proportion of a basic nitrogenous substance selected from the group consisting of primary, secondary and tertiary aliphatic amines, primary and secondary aromatic amines, amino-alcohols, piperidine, piperazine and ammonia, said substance being capable of giving a pH value of at least 9.5 and soluble to at least some extent in the particular solvent employed.

3. The method according to claim 1 in which the basic nitrogenous substance is a primary aliphatic amine.

4. The method according to claim 1 in which the basic nitrogenous substance is a secondary aliphatic amine.

5. The method according to claim 1 in which the basic nitrogenous substance is ammonia.

6. The method of preparing a liquid coating composition which comprises mixing solid, hot-vulcanized fatty oil with an organic solvent selected from the group consisting of aliphatic and aromatic hydrocarbon solvents, and turpentine, in the presence of a basic nitrogenous substance selected from the group consisting of primary, secondary and tertiary aliphatic amines, primary and secondary aromatic amines, amino-alcohols, piperidine, piperazine and ammonia, said substance being capable of giving a pH value of at least 9.5, and soluble to at least some extent in the particular solvent employed, and incorporating in such solution a quantity of wax.

7. The method of preparing a liquid coating composition which comprises mixing solid, hot-vulcanized fatty oil with an organic solvent selected from the group consisting of aliphatic and aromatic hydrocarbon solvents, and turpentine, in the presence of a basic nitrogenous substance selected from the group consisting of primary, secondary and tertiary aliphatic amines, primary and secondary aromatic amines, amino-alcohols, piperidine, piperazine and ammonia, said substance being capable of giving a pH value of at least 9.5, and soluble to at least some extent in the particular solvent employed and incorporating in such solution a quantity of one or more substances selected from the group consisting of rosin and resins.

8. The method according to claim 7 in which the substance incorporated in the solution is selected from the group consisting of tars and asphalts.

KARL WERNER POSNANSKY.

REFERENCES CITED

The following references are of record in the file of this patent:

UNITED STATES PATENTS

| Number | Name | Date |
|---|---|---|
| 2,234,545 | Auer | Mar. 11, 1941 |
| 2,413,281 | Auer | Dec. 31, 1946 |